Oct. 10, 1933.　　　C. B. HUNTMAN　　　1,929,690
AIRCRAFT PROPULSION
Original Filed Nov. 13, 1930　　4 Sheets-Sheet 2
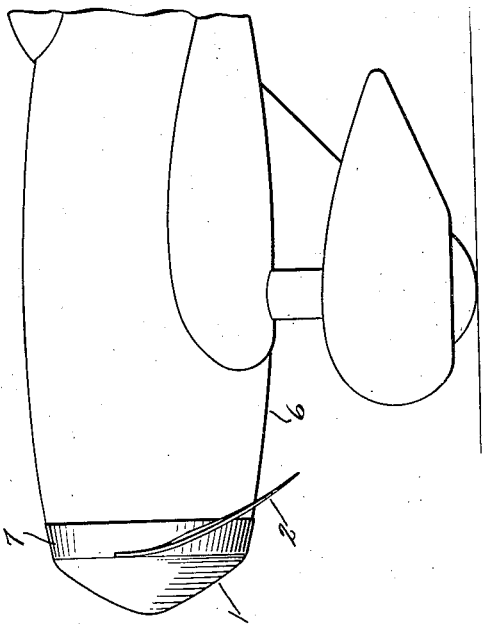
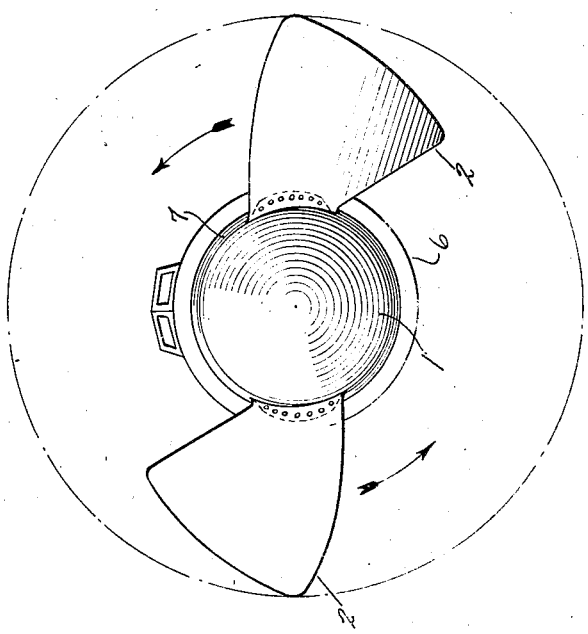
INVENTOR
Charles B. Huntman
BY
his ATTORNEY Oct. 10, 1933.　　　　C. B. HUNTMAN　　　　1,929,690
AIRCRAFT PROPULSION
Original Filed Nov. 13, 1930　　4 Sheets-Sheet 3
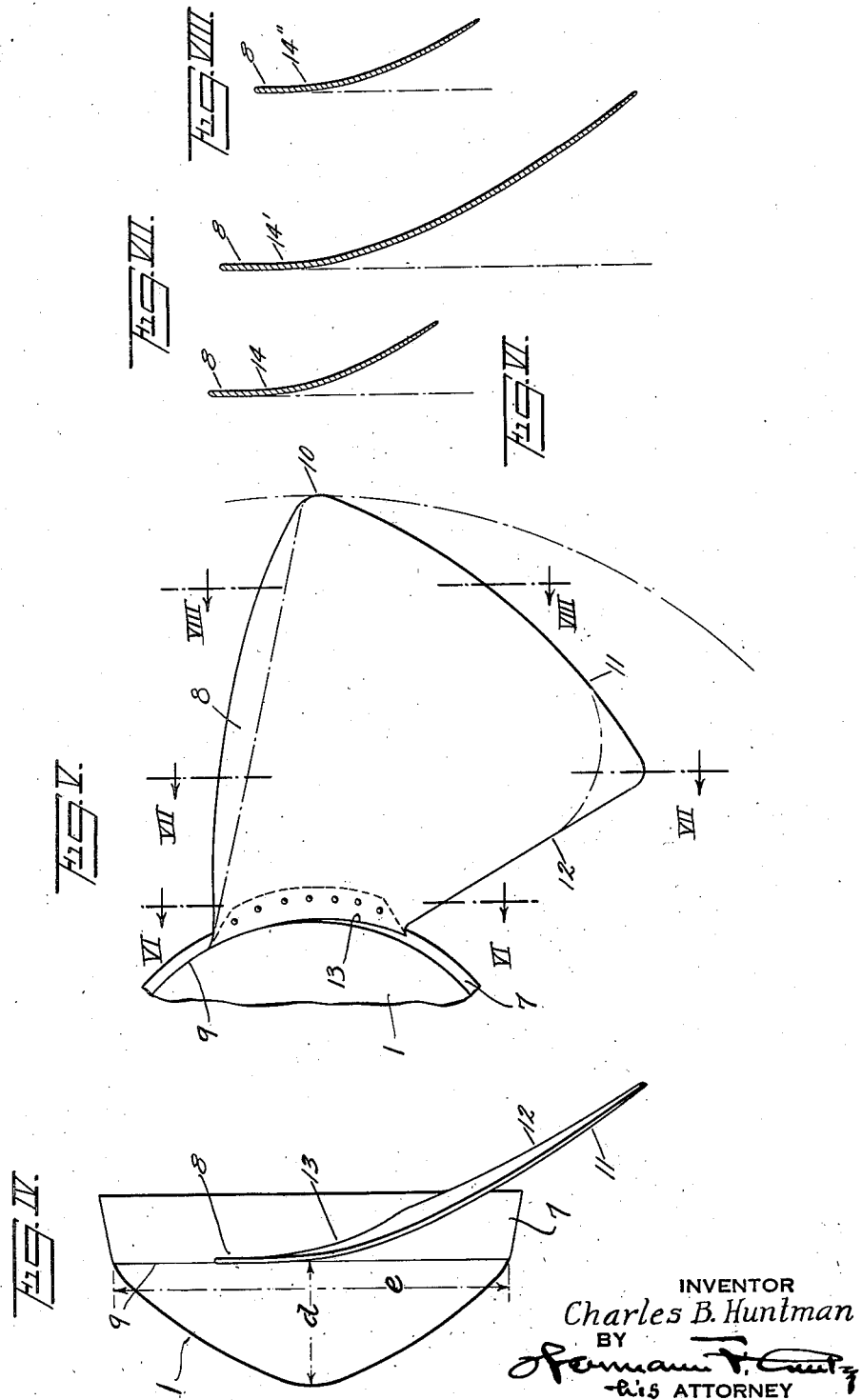
INVENTOR
Charles B. Huntman
BY
his ATTORNEY

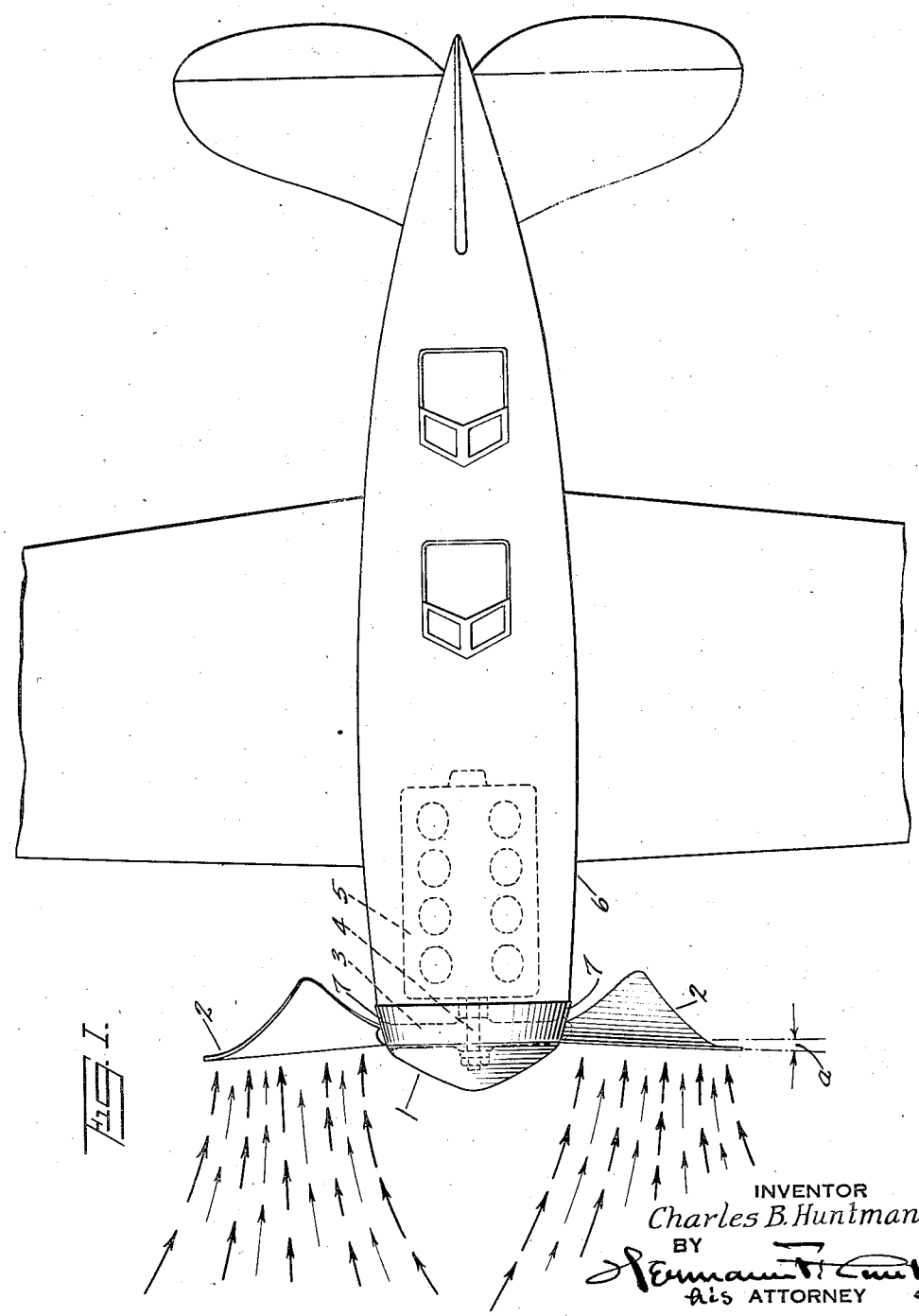

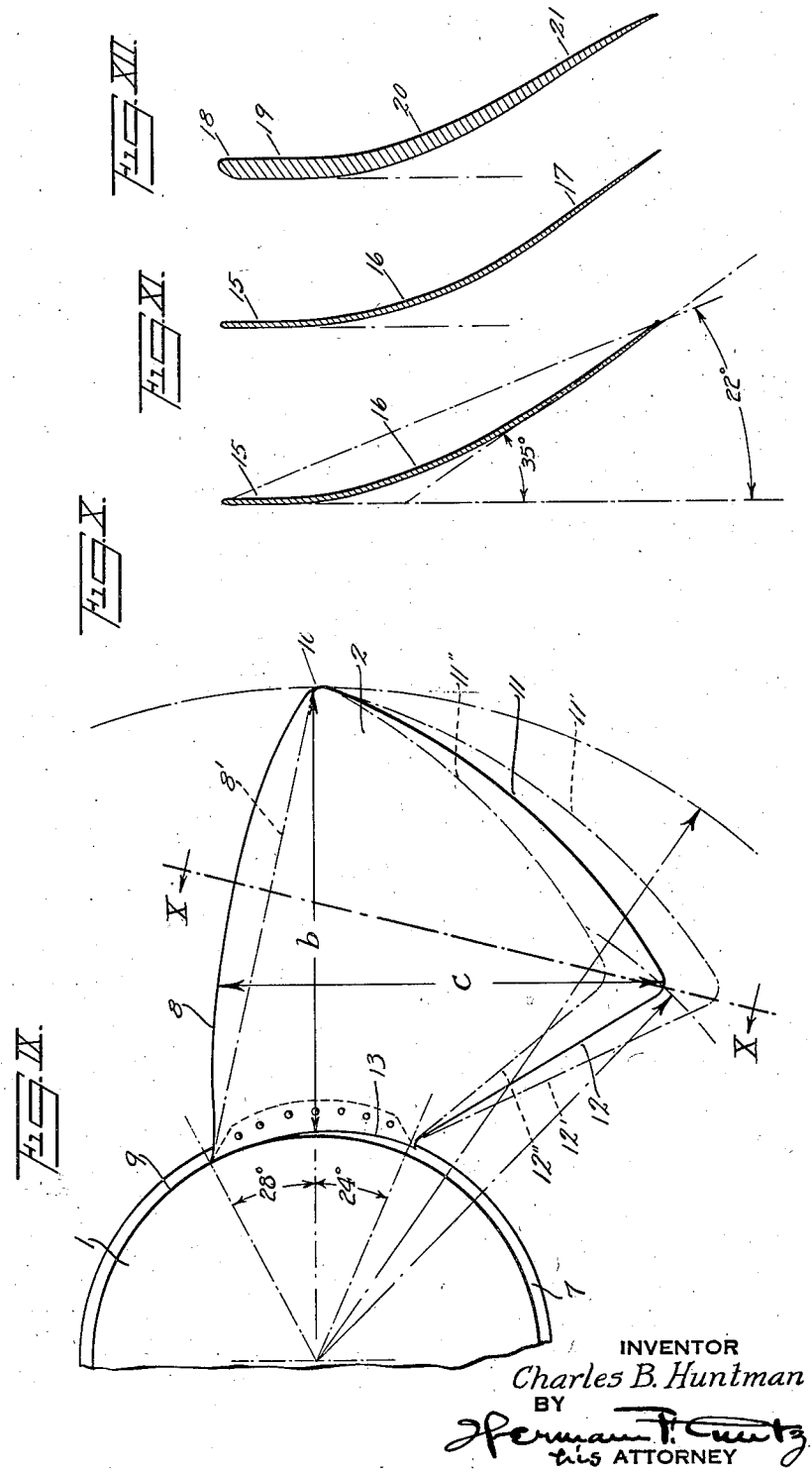

UNITED STATES PATENT OFFICE 1,929,690

AIRCRAFT PROPULSION

Charles B. Huntman, Plainfield, N. J.

Application November 13, 1930, Serial No. 495,349
Renewed February 24, 1933

22 Claims. (Cl. 170—159)

This invention relates to aircraft propulsion, but in more broad terms it involves the securing of greater reaction and greater efficiency of revolving blades for use in any form of aircraft, and also for other purposes.

In its application to aircraft it involves particular forms of blades in conjunction with the mounting of such blades that has yielded a substantially greater thrust per horse-power than delivered by the forms of propellers heretofore used on aircraft; and rotating frontal domes, as hereinafter described.

The aircraft propulsion involves not alone the particular form of blade or blades, but the mounting of the blades and the arrangement of the structure as a unit, in order to secure the maximum efficiency. The substantially increased thrust developed by my invention compared with heretofore used propellers, has been proven by many tests. Hundreds of tests have been made with a great variety of modified forms of mounting and blades, with a net result that my development, as hereinafter set forth, has yielded per horse-power a reaction or thrust as high as two and a half to three times the thrust attained by the best propellers now generally in use. In the operation of these numerous tests at revolutions ranging throughout and below and above the usual speeds of power units now used on airplanes, the reaction or thrust at the best operating speeds has slightly exceeded three times the usual propeller thrust per unit of power.

The constructions embodying my invention may be varied in many ways, and of course as to size depending upon the power it is desired to transmit and the speed of the plane for which it is designed. The preferred form of my invention, which has been confirmed by these extensive experiments, may be said to consist of a flat, that is low convex rotating nose or forward-facing rotating dome of substantial diameter with generally radial blades, rotating with the dome, and extending radially beyond the dome a maximum radial distance approximating the diameter of the dome.

The rotating dome with the blades, as hereinafter described, which are relatively short radially, yield these very advantageous results in reaction. However, the pitch and contour of the leading and trailing edges of each blade, as well as the form of the end of the blade involve essential features of coordination, in order to secure the efficiency.

While the structure of each blade, either thin sheet or built-up, may vary, the profile of the blade and the pitch require particular design to meet each particular case of revolutions and desired speed of the aircraft on which it is to be used.

The propulsion unit, comprising the rotating dome and blades, when applied to the front of a fuselage, must be designed in coordination with the streamlining of the fuselage. Likewise when applied to the leading edge of the wings, or in the case of airships when applied to the suspended power gondolas will assure the maximum efficiency by the proper design of the coordinated mounting.

My invention broadly considered in certain respects involves the substantial reduction in head resistance, and a great reduction in drag from any trailing part of the blades.

From the above it will be noted that the substantial reduction of head resistance may be realized by rotating domes, preferably flat meaning low, as hereinafter explained, of a size approximating the frontal aspect of a fuselage or any nacelle, or body of an aircraft, thereby reducing the head resistance although the propulsion blades may be mounted apart from some of the rotating domes. The rotating domes suitably applied, and rotated at the proper speeds cause the reduction of head resistance.

Such a construction therefore naturally involves the rotating dome of a shape and of a size relative to the following nacelle or streamline body, that the rotating of the dome may become in certain applications of my invention, a matter of coordination with the general structure of the aircraft, and thereby result in a formation of the dome, and a speed of rotation of the dome apart from the most desired design of propulsion blade with respect to its speed of rotation. This will be more particularly appreciated with respect to certain now well known airplanes in which two motors and propellers flank a central body, and in such cases a rotating dome on the central body or fuselage will reduce its head resistance, and the two flanking propellers with their properly proportioned domes will lead to greatly increased efficiency of the propulsion of the aircraft per unit of power.

Particular embodiments of my invention are shown in the accompanying drawings, in which:

Fig. I is a plan view of one form of my propulsion unit mounted at the nose of the fuselage of an airplane of otherwise conventional design.

Fig. II is an elevation viewed from the bow, showing the frontal aspect of my propulsion unit.

Fig. III is a side elevation of the same airplane showing my propulsion unit with blades as in Fig. II.

Fig. IV is a side elevation, on a larger scale, showing the rotating dome, and one blade viewed from its end in a radial direction.

Fig. V is an elevation of one blade and its mounting, viewed on a line parallel to the axis of the rotating dome and driving shaft.

Fig. VI is a section on line VI—VI of Fig. V, showing the pitch and other curvature of a blade near its butt or point of attachment to the rotating dome.

Fig. VII is a section of the blade at VII—VII in Fig. V, which is approximately on a line tangent to the maximum radius of the blade, and through the maximum breadth from leading edge to trailing tip.

Fig. VIII is a section VIII—VIII in Fig. V, at a point from the leading edge close to the point of maximum radius of the blade that is near the blade tip.

Fig. IX shows an elevation of a single blade and its relation to the rotating dome, shown part fragmentary, with modifications as to certain outlines, or alternate shapes, to illustrate certain permissible leeway in design that will still yield the advantageous results.

Fig. X is a section of the blade shown in Fig. IX, on line X—X, approximately in a plane normal to the chord of the leading edge.

Fig. XI is a section of the blade on line X—X, Fig. IX, showing a variation of curvature approaching the trailing end or trailing tip.

Fig. XII is a typical cross-section in the vicinity of the maximum breadth of the blade, of a built-up or double surface blade structure, to show the general curvature to be maintained in a rigid blade and generally the profile of the leading edge and trailing end.

Figs. I, II and III show the rotating dome 1 with the blades 2 supported to rotate with the dome. In the particular form illustrated, the driving hub 3, shown in dotted lines, is mounted on the engine drive shaft 4 with the power unit 5, illustrated in dotted lines, within the casing of the fuselage 6. In this form the power is transmitted by the hub or arm bracket 3 to the blades 2 with the flat dome 1 forming a forwardly-facing convex casing, the apex of which is forward approximately one-third of the diameter of the dome base portion, that is at the transverse section where the leading edges of the blades meet the dome, and the dome is continued or merges into a skirt 7 with a surface more abruptly turning inward to meet and form a contiguous surface with the stream-lining of the fuselage. This skirt may have a curvature or be conical, and the precise curvature of the flat forward dome portion and the skirt may be varied somewhat, though in the form illustrated tests have shown most advantageous results, which are not attained when, for example, the height of the apex of the dome or the shape are greatly changed.

In the case illustrated it will be noted that the maximum cross-section of the fuselage is but slightly greater than the base of the dome, and under these conditions the relative flow of air involves the creation of a large forward rarefied zone ahead of the dome 1, and a consequent relative movement of air as indicated by the arrows. Thus the relatively moving air is such that the blade reaction begins a short distance radially outward from the junction of the blade with the dome skirt, and at the outer end of the leading edge the relative movement of the air converges, with the result that in such case of approximate proportions of dome and fuselage I set the leading edge of the blades with a forward inclination at an angle $a$, which for the case shown does not exceed four degrees, and under these conditions the direction of movement of the air relative to the leading edge of the blade averages substantially normal engagement with the central section of the effective blade area.

While the power transmission is thus shown as carried by a robust hub or radial arms mounted on the drive shaft, entirely encased within the dome and skirt, I may construct the dome and skirt and connect them with the bow, and to be the power-transmitting means, and attach the blades to the outer surface of the skirt. Although questions of lightness of weight favor the design shown, and among other reasons one is the fact that the rotating dome, of the very effective shape that I have discovered, carries no substantial pressure and therefore can be made relatively light, provided the power transmitted to the blades is supported by a bracket, such as shown. The forward inclination of the leading edge, as indicated at angle $a$, will be varied for any particular design depending upon the following surfaces behind the dome, as to whether it is a fuselage of maximum cross-section slightly greater than the dome, or whether it is a gondola with a much smaller fineness ratio, or whether the rotating dome and blades as a propelling means are applied to any other portion of an aircraft having a streamline structure following the dome of substantially greater cross-section. However, the rear surface of each blade may be built up by making it thicker at the butt, that is at its junction with the rotating dome and tapering toward the leading edge tip, in which case the forward surface of the leading edge may be in all cases at right angles to the axis of rotation. In fact, when the blades are made of sheet material of uniform thickness the leading edge may be substantially at right angles to the axis of rotation, and give a reaction almost the same as shown by numerous tests, as compared with a slight forward set as shown.

In the development of my invention many tests have included a hundred or more variations of the particular shape and relative size of the rotatable dome and blades, and in particular the shape of blade which has yielded the maximum reaction per unit power involves the features as shown in the drawings, and in more detail in the enlarged views of blades and sections. The thrust attained per horsepower with the specific form illustrated has exceeded twenty-one pounds. In tests where a variation of the trailing edge or a variation in the relative sweep compared with the radial extent of the leading edge, or varying the sweep-back outline of the propeller blade end, material changes from the design shown have caused a very substantial diminution in thrust per horsepower. The excellent results attained in thrust per horsepower have indicated an approximation therefor to the design which includes having the maxmum radial extent of the blade $b$ beyond the dome approximately the diameter of the dome, and having the leading edge rear surface substantially coincident with the plane of rotation, and then curved rearward with an increase in curvature to the trailing tip, so that at the maximum breadth of the propeller blade the trailing edge rear surface approximates thirty-five degrees with the plane of rotation.

Coupled with this the outer edge of the blade sweeps back from a circle around the axis of rotation so that progressively from the tip of the leading edge inward, there is a shorter and shorter radial contact of the back surface of the propeller with the air, and without this sweep-back of substantial amount, a great drop in thrust per unit power was registered. The trailing edge in turn is preferably approximately straight on a line diverging rearward from a radius from the centre of rotation, and any modification that includes the interference with the space between the dome and the trailing edge, causes a drag that immediately reduces substantially the thrust per horsepower. As shown, this trailing edge starts from a point on the base of the dome approximately at the same angle behind the radius from the dome centre to the tip of the blade, as the leading edge is forward of that radius, while a most efficient model tested gave these angles, as shown, twenty-four degrees and twenty-eight degrees, respectively. Such design gives the leading edge tip a relative position with respect to the breadth of the blade, with the curvature shown, and with an open space between the trailing tip and the dome edge which eliminates drag, and thereby adds with the other elements to the efficiency attained in my tests. The sweep-back of the outer edge of the propeller is best such as to meet the trailing edge at a point approximating three-fourths of the radial distance from the centre of rotation, compared with the maximum leading edge radius.

These factors will be more fully understood by reference to Fig. IX, in which blade 2 has its leading edge 8 sweeping back from a radial line at its junction with the edge 9 of dome 1 to the tip 10 of the leading edge, while the exact curvature from base to tip may vary from a straight line 8', as shown in dot and dash, to the curvature, as shown, in 8, without any great variation in the reaction attained by my tests. The outer edge 11 of the propeller has a back sweep on a curve which may be an arc, and may be a flatter curve than shown, although when made as a straight line the propulsion unit became less efficient by approximately one pound thrust per horsepower, other dimensions and design being equal. This blade edge, however, may be as shown in dash and dotted lines 11' and 11", thereby cutting down the area of the surface of the blade, and meeting the trailing edge at a slightly varied angle, so that the maximum breadth of the blade from the leading edge to the trailing tip is less or more,—which involves the question of design for the particular power conditions and the particular unit to which my propulsion structure is applied, such as the desired cruising or maximum speed for which the ship is designed, the revolutions of the dome, and in general the aerodynamic factors of the aircraft to which the propulsion unit is applied. Thus, the trailing edge 12 may be varied as shown in the dash and dot lines 12' and 12", and in any case leaving a gap between the dome surface and the trailing edge tip, so that air leaving the blade close to its butt or line of attachment to the dome will clear the blade surface quicker than the air in contact with the blade further out. These arrangements of design lead to the air passing into the slipstream without developing drag, or in any event with the minimum drag, and conversely the high thrust per horsepower which tests have proven is attained. Viewed in one way the shape and area of my blade is such that at greater radius having greater linear speed, the blade surface has a shorter contact with the air, and at lesser radius it has a longer contact with the air but with a continued rearward curvature of the blade surface, so that an approximation is attained of a net uniform reaction at different radial points of the blade.

The curvature of the blades is illustrated in Figs. IV to VIII, in which Fig. IV shows an end view of the blade and the side view of the dome, in which the leading edge is positioned approximately at the base of the rotating dome. The butt of the blade 13 joins the skirt of the dome on a helix or modified helical curve, and the shape of the blade near the butt is shown in Fig. VI in which the section, when the blade is made of a substantially uniform sheet, has its leading edge substantially straight, that is in the plane of rotation, and from a point 14 to the intersection with the trailing edge the surface is on a gradually increasing rearward curve. In the section through the maximum breadth of the blade the leading edge has a broader surface substantially in the plane of rotation, and then from a point 14' curves rearwardly with an increasing angle to the plane of rotation which reaches approximately thirty-five degrees for the tangent of the surface near the trailing tip, compared with the plane of rotation. The section shown in Fig. VIII has its leading edge straight for a short distance, and at point 14" curving rearward with a gradually increasing degree. The necessity of the leading edge being straight, that is in the plane of rotation, is not an essential, but the best results by tests indicate that an extent of the leading edge should not be at an angle with the plane of rotation exceeding four degrees.

As shown in Figs. X, XI and XII the sections are on a line of the greatest breadth of the propeller from trailing tip to the leading edge at right angles to the chord of the leading edge, and in that respect the three views show a section in which a portion of the surface near the leading edge is a few degrees inclined to the plane of rotation, and the remainder of the surface is of increasing rearward curvature on the back side of the blade. In Fig. XI the shape is modified so that an area beginning at 17 is straight, that is on a tangent to the preceding curvature, and with such arrangement of trailing tip slightly better results giving the maximum thrust have been attained. The section shown in Fig. XII has a leading edge nose profile 18 similar to an airfoil leading edge with the rear blade surface corresponding to the underside of the airfoil nose, and this section shows a heavy structure of blade to maintain the predetermined form of design. It includes a substantially straight portion 19 on the rear surface of the blade near the leading edge merging into the rearwardly curved surface portion 20, and tapered near the trailing end so that the rear and front surfaces of the wing join at the trailing tip, and preferably have from point 21 a straight rear surface portion which, in fact, may be slightly reverse curved from the main extent of the wing surface.

It may thus be seen that my blade may be so constructed that a substantial breadth of blade at, and following near the leading edge, can be made a rigid structure with a spar or spars projecting into the dome and carried by a hub structure connected with the driving shaft in ways that provide rigidity and lightness to resist all strains. Furthermore, the blade area beyond such rigidly supported portion may in certain modifications be articulated or hinged, as, for example, in the vicinity of the point 20, shown in Fig. XII, or even a second hinge nearer the trailing edge, may thus provide for varying the curvature of the rear surface of the blade, with suitable connections in the interior of the rigid portion of the blade, connecting with the hub, whereby such trailing surface of the blade may be varied in curvature throughout a substantial area, and particularly at and near the trailing tip. In certain cases I may have a limited area of trailing tip supported on the rest of the built-up blade so that the pitch may automatically vary, and thereby take a position at any given speed or air conditions so as to minimize drag. In this manner the arrangement of rotating dome and blade permits of a structure in which the blade pitch may be voluntarily varied, or over a small area may vary automatically for purposes of efficiency, though the voluntary variation of curvature lends itself to varying the thrust, even to the extent of shifting part of the blade area to a position that would cause a braking effect in order to stop the roll of an airplane after landing, or to positively decrease the speed.

While variations may be made in the ratios of the rotating dome, its shape, and the blades, and the further application of my inventions will lead to such variations to meet all the particular conditions as to whether the propulsion means is mounted on the bow of a nacelle of one or another form, or a motor casing on or in a wing, or otherwise, my numerous experiments have indicated that the best results were attained, in test models varying up to over three feet in diameter, with the rotating dome having a maximum forward projection $d$, to its apex, slightly less than one-third the diameter $e$ of the dome at its base in the plane in which the leading edges of the blade were supported. With this the maximum thrust was attained when the breadth of the propeller $c$, from leading edge to trailing tip, was approximately equal to the radial extent $b$ of the blade from butt to leading edge tip; and in which the base of the propeller joined the skirt of the dome on a helix which reached at the trailing edge a maximum curvature or pitch of about eighteen degrees, while the curvature through the broadest part of the blade had a curvature or pitch reaching a maximum near the trailing edge of about thirty-five degrees. Tests of the propulsion unit with those proportions gave a thrust at 1400 revolutions slightly over ten pounds per horsepower, steadily increasing to over twenty pounds per horsepower at 1700 revolutions, and was slightly over twenty-two pounds per horsepower at 2050 revolutions.

It will be noted in tests particular forms of my invention have proven very advantageous, that my rotating dome substantially encompassing the frontal aspect of the nacelle, yields the efficiency at the same speed of rotation of the blades having the ratios and dimensions above set forth. I may, however, rotate the forwardly convex surface of the nose dome at varying speed, and with increased speed I deliver an air streamline approach varying dependent upon the speed of the dome. My tests have shown that a large forward projection of the apex of the dome detracts from the efficiency of my propulsion apparatus; but, on the other hand, the revolving dome as described has shown a rarefication of air forward of the dome in its axis a distance three times the diameter of the dome, and it has also shown a laterally conical deflection of the relatively approaching airstream, so that with the dimensions of propulsion unit heretofore described, the flow of air becoming effective at the blades is a little radially beyond the rotating nose, and is completely effective throughout the radial extent of the blades. The resultant effect of the revolving nose of the relative dimensions above set forth, and as shown in the drawings, is to have the cooperating blades provide in conjunction therewith the efficiency which has been indicated by the elaborate tests that I have made.

The net result of my invention may in one aspect be recognized as providing a rotating nose substantially as shown, at its base practically of the same frontal aspect of a nacelle or equivalent power-supporting unit or casing, and thereby yield with itself and in conjunction with the streamlining of the nacelle one great advantage involved in my invention. However, in addition there are various factors of advantage with respect to which one in particular may be mentioned that is at the present time an otherwise insoluble problem, namely, the noise or crack of the propeller of the standard or accepted present day form. My invention, involving the rotating dome and relatively stub blades, results in the avoidance of turbulence at the blade edge as well as at the trailing edge, of a character that would otherwise in the ordinary form of propeller create a condition that is today generally recognized as the cause of propeller noise. Thus in addition to the efficiency of my propeller, an air-flow is created, with the elimination of drag and turbulence that results in a smooth and even flow of air with the resultant combination of efficiency and elimination of sound compared with any propeller blade heretofore in use.

In the conduct of the experiments Venturi or air-pressure meters have indicated the conditions in advance of my propulsion unit, and also the conditions at all of the numerous distances radially in the slipstream behind the blades, showing that generally uniform results are attained with usually a maximum rearward air speed a little beyond the radius of the tip of the trailing edge. Thus I may design such modifications for any particular application of my invention, in order that substantially uniform reaction is attained at all radii of the blade, although this will depend upon the following streamline to the rear of the propulsion unit of the nacelle or fuselage or wing, or other body of frontal aspect and its particular aerodynamic aspect.

As to the rotating dome effect in conjunction with the propulsion blades, it becomes desirable in certain types of airplanes and seaplanes that the propelling blades must be mounted on an axis substantially displaced away from the axis of the nacelles or aircraft bodies.

Under such circumstances a material reduction of frontal resistance results from mounting my low dome at the nose of the nacelle, although the propelling blades be disposed above or otherwise remote from the axis of the nacelle or airplane body or fuselage. In some cases I therefore mount my rotating domes with a frontal aspect of a size corresponding with the frontal aspect of a seaplane body or bodies, but with my propelling blades combined with such rotating domes or noses wherever they may be located with respect to the airplane or aircraft bodies. A resultant diminution of frontal resistance is achieved as well as a greater efficiency of the propeller blades in conjunction with their proximate rotating dome.

My tests have shown that my invention in its particular form herein shown and described, yields very advantageous results in efficiency of propulsion, or conversely may result in propelling speeds per load with a relative diminution of required power. Many modifications and adaptations of my invention will be made in ways indicated as above, so soon as the commercial adaptation of my invention has become known to others, and while many variations and modifications from what has hereinbefore been shown and described may be made, what I claim and desire to secure by Letters Patent is:

1. Aircraft propulsion means comprising a low convex rotatable dome symmetrically disposed about the axis of a rotary driving shaft, a plurality of blades rotating with said dome and of a radial extent approximating the diameter of the dome, and having a sweep-back outer edge and a diverging trailing edge.

2. Aircraft propulsion means comprising a power shaft, a low dome facing the direction of flight of the aircraft mounted to rotate with said shaft and having a forwardly-facing convex contour projecting to its nose less than the diameter of the dome, and a plurality of generally radial blades extending from the base of the dome in plane back of its convex contour and mounted to rotate with said dome and of lateral extension approximating the diameter of the dome.

3. Aircraft propulsion means comprising a low rotatable dome convex in the direction of flight, a plurality of blades extending from the base of the dome with a leading edge of each blade approximately equal in radial extent to the diameter of the dome base, and having a helical surface extending to the trailing edge of the blade.

4. Air craft propulsion means comprising a rotatable low dome convex in the direction of flight, a plurality of blades extending from the base of the dome with a leading edge of each blade approximately equal in radial extent to the diameter of the dome base and presenting a reaction area of less than ninety degrees circumferentially, and having a surface near the trailing edge approximately in the plane of rotation and merging into a rearwardly curved surface.

5. Aircraft propulsion means comprising a low rotatable dome convex in the direction of flight, a plurality of blades extending from the base of the dome with a leading edge of each blade approximately equal in radial extent to the diameter of the dome base, and having a surface of reaction approximately in the plane of rotation adjacent the leading edge of the propeller merging into rearward spiral curvature with a portion near the trailing tip a helix less than the merging spiral curvature.

6. Aircraft propulsion means including a low rotatable dome convex in the direction of flight, having a plurality of blades extending from the base of the dome, said blades having a cross-section from their leading edge to the trailing tip beginning with a surface near the leading edge approximately in the plane of rotation and with increasing rearward curvature toward the trailing end to a point a little short of the trailing end.

7. Aircraft propulsion means including a rotatable low dome convex in the direction of flight, having a plurality of blades extending from the base of the dome, each blade having a frontal aspect of a radial extent approximating the diameter of the dome and a length from leading edge to trailing tip approximately equal to its radial extent and having the trailing edge of each blade and the leading edge diverging from the junction of the blade with the base of the dome.

8. Aircraft propulsion means including a low rotatable dome convex in a direction of flight, having a plurality of blades extending from the base of the dome, each blade meeting the dome base with a helical section of slightly varying curvature, and having the leading and trailing edges diverging from the dome to an outer blade edge of maximum extent at the leading edge and sweeping back to a substantially lesser diameter of the outer edge adjacent the trailing edge.

9. Aircraft propulsion means including a rotatable low dome convex in the direction of flight, having a plurality of blades extending from the base of the dome, each blade having means of support at its junction with the lateral base of the dome and a blade width at the junction extending over an arc less than and forward of the trailing area of the blade.

10. Aircraft propulsion means including a rotatable low dome convex in the direction of flight, having a plurality of blades extending from the base of the dome, each blade extending from the side of the dome base with a leading edge having a slight sweep-back from a radial line, and having a generally straight trailing edge diverging rearward from a radius at its dome junction to an angle in the order of about forty-five degrees.

11. Aircraft propulsion means including two or more propeller blades projecting radially from the side of the base of an axially disposed approximately flat nose having a diameter substantially equal to the length of the blades, said nose being rotatable with the blades and having a forward convexity flat at the axis and then curving rearwardly merging into side areas generally parallel with the axis at the place of merging with the butts of the blades, the apex of the nose being approximately one-third of the distance in front of the plane of the lateral diameter, and interconnecting means whereby the blades and the nose rotate in unison.

12. Means for the propulsion of aircraft comprising a low rotating dome facing the direction of flight, a plurality of propeller blades projecting from the sides of the base of the dome approximately equal in length to the diameter of the dome base and having a generally helical section from leading edge to trailing edge, and a circumferential maximum dimension in excess of half the blade length.

13. Driving means for aircraft including a low rotating dome convex in the direction of flight, a plurality of blades each extending radially a distance approximately the diameter of the dome, the leading edge of each blade being substantially straight, and extending outwardly in a zone limited by a normal radius or a forward inclination not exceeding approximately five degrees when the frontal aspect of the structure behind the dome is not substantially greater than the cross-section of the dome base.

14. An aircraft driving means of the character described, having each blade leading edge substantially in the plane of rotation normal to its axis and receding in a gradually increasing curve therefrom to the trailing edge with the curvature in the vicinity of the trailing tip approximately thirty degrees back of the plane of rotation when the breadth of the blade approximates its length.

15. Aircraft driving means including a low rotating dome in the order of maximum height less than half its diameter, two or more propeller blades projecting radially from the skirt or side of the dome base an extent approximately equal to the diameter of the dome base, a reaction surface extending from each blade leading edge in an increasing helical curve to the trailing tip with a sweep upwards of two-thirds the radial extent of the blade, and having its trailing edge diverging rearwardly from a tangent to the dome base and having the outer edge of the propeller converging from the arc of a circle at the tip of the blade.

16. Aircraft driving means as set forth in claim 15, having the radial elements of its leading edge of its reaction surface forwardly inclined from a radius at right angles to the axis of the rotating dome.

17. In an airplane, a streamlined fuselage, a solid surface low dome rotatably supported at the front of the fuselage with its base approximating the transverse section of the fuselage at its junction, a plurality of blades rotatable with said dome and projecting radially an extent to their tip approximating the diameter of the dome, and having a trailing edge terminating a curved reaction surface from the leading edge a major extent of the maximum radius of the blade, with a sweepback blade end and a trailing edge diverging rearwardly from the dome base.

18. In an airplane, a fuselage terminating at the front in a section approximating or slightly less than the maximum cross-section of the fuselage, a rotating dome adjacent the front of the fuselage having a forwardly-facing convex formation of a depth less than half its diameter and with its surface merging into a skirt substantially flush with the streamlined surface of the front of the fuselage, a plurality of propelling blades projecting from the skirt of the dome an extent approximating the diameter of the dome skirt, each having its leading edge projecting close to the junction of the dome surface with its skirt, each blade having a surface following the leading edge rearwardly curved to a trailing tip an extent exceeding a major portion of the blade radius, and having the blade end and the trailing edge converging at a point approximating half the radius of the blade leading edge.

19. In an aircraft, a propulsion unit, a forwardly projecting shaft, a rotating low forwardly convex dome having its diameter not less than twice its forward amplitude, and a plurality of blades extending radially and rotating with said dome having their leading edges substantially in the plane of the base of the dome base to the rear of its convex formation, said dome having a substantially flat axial frontal area gradually curving rearward to a substantially cylindrical base.

20. An aircraft propulsion unit comprising a low dome forwardly convex rotatable on the axis of the unit, two reaction blades projecting from the base of said dome a radial extent approximately not exceeding the diameter of the dome and having a greater width of blade a substantial distance beyond the dome base, and a reentrant trailing edge with respect to the direction of the leading edge.

21. An aircraft propulsion unit having two rotatable reaction blades each having its reaction area solely in the outer third of the diameter of the unit, a low dome encompassing approximately the entire inner third and having a forwardly convex smooth surface flat near the axis, and gradually curving to parallelism with the axis of rotation at its junction with the butts of the blades.

22. An aircraft propulsion unit comprising a circular convex plate with its centre in the axis of the propulsion unit, and mounted for rotation having its forward surface smooth and substantially flat near the axis curving gradually rearward toward its preriphery, and at the base forming an approximately cylindrical surface in conjunction therewith of a plurality of reaction blades extending radially from the dome base substantially not in excess of the diameter of the dome.

CHARLES B. HUNTMAN.